(12) United States Patent
Berger et al.

(10) Patent No.: US 12,743,144 B2
(45) Date of Patent: Sep. 22, 2026

(54) STANDBY MODES TO MINIMISE CONSUMPTION AND STARTUP TIME

(71) Applicant: SAGEMCOM BROADBAND SAS, Bois-Colombes (FR)

(72) Inventors: Jérôme Berger, Bois-Colombes (FR); Gabriel Bouvigne, Bois-Colombes (FR)

(73) Assignee: SAGEMCOM BROADBAND SAS, Bois-Colombes (FR)

( * ) Notice: Subject to any disclaimer, the term of this patent is extended or adjusted under 35 U.S.C. 154(b) by 70 days.

(21) Appl. No.: 18/521,588

(22) Filed: Nov. 28, 2023

(65) Prior Publication Data

US 2024/0176408 A1 May 30, 2024

(30) Foreign Application Priority Data

Nov. 28, 2022 (FR) ...................................... 2212397

(51) Int. Cl.

*G06F 1/32* (2019.01)
*G06F 1/3231* (2019.01)
*G06F 1/3287* (2019.01)

(52) U.S. Cl.

CPC .......... *G06F 1/3231* (2013.01); *G06F 1/3287* (2013.01)

(58) Field of Classification Search

CPC ..... G06F 1/3231; G06F 1/3287; G06F 1/3293
See application file for complete search history.

(56) References Cited

U.S. PATENT DOCUMENTS

| | | | | |
|---|---|---|---|---|
| 9,846,471 | B1 * | 12/2017 | Arora | G06F 1/3209 |
| 11,856,256 | B1 * | 12/2023 | Li | H04N 21/44218 |
| 2010/0007801 | A1 | 1/2010 | Cooper et al. | |
| 2012/0226981 | A1 | 9/2012 | Clavin | |
| 2012/0327458 | A1 | 12/2012 | Baba et al. | |
| 2014/0344599 | A1 * | 11/2014 | Branover | G06F 1/3203 713/323 |

* cited by examiner

*Primary Examiner* — Stefan Stoynov
(74) *Attorney, Agent, or Firm* — MUNCY, GEISSLER, OLDS & LOWE, P.C.

(57) ABSTRACT

Piece of equipment (1) comprising at least one sensor (4, 6), at least one first component (8) and at least one second component (11, 12), which is quicker to start up than the at least one first component, the piece of equipment being arranged to operate according to at least:

one first standby mode, wherein at least one first sensor (4) is switched on, the piece of equipment implementing a first presence detection function;

one second standby mode, wherein at least one second sensor (6) is switched on, the piece of equipment implementing a second presence detection function;

one third standby mode, wherein the at least one first component (8) is switched on and the at least one second component is not switched on.

18 Claims, 2 Drawing Sheets

STANDBY MODES TO MINIMISE CONSUMPTION AND STARTUP TIME

The invention relates to the field of putting electrical equipment on standby, such as set-top boxes, smart speakers, etc.

BACKGROUND OF THE INVENTION

Managing putting electrical equipment on standby is a subject which is currently particularly critical, as this management has a major impact on our overall electricity consumption.

Certain electrical equipment integrates components which have a relatively long startup time. These components are, for example, microprocessors needing to execute an operating system (or OS), as well as complex applications, or communication interfaces (Wi-Fi, for example).

Designers of electrical equipment are confronted with the following dilemma.

Such that putting on standby makes it possible to reduce electricity consumption significantly, it must be that the maximum amount of components, and in particular, the components which have a high electricity consumption, are switched off when the equipment is on standby. Yet, if the components having a long startup time are switched off when the equipment is on standby, the startup time is long when the user requests the equipment to start up.

Two choices therefore present themselves to the designer: switch off the components having a long startup time when putting on standby, which degrades the experience of the user, or leave these components at least partially switched on, which limits the reduction of electricity consumption.

Aim of the Invention

The invention aims to reduce the electricity consumption of a piece of equipment put on standby, while decreasing the startup time of the equipment when a user wishes to use it.

SUMMARY OF THE INVENTION

In view of achieving this aim, a piece of equipment is proposed, comprising at least one sensor, at least one first component and at least one second component which is quicker to start up than the at least one first component, the equipment being arranged to operate according to at least:

- one first standby mode, wherein at least one first sensor is switched on, the at least one first component and the at least one second component not being switched on, the piece of equipment implementing a first detection function to detect a presence of a user, using the first sensor;
- one second standby mode, wherein at least one second sensor, identical or not to the at least one first sensor, is switched on, the at least one first component and the at least one second component not being switched on, the piece of equipment implementing a second detection function to detect the presence of the user, more accurate and more consuming than the first detection function, using the at least one second sensor;
- a third standby mode, wherein the at least one first component is switched on and the at least one second component is not switched on;
- one active mode, wherein the at least one first component and the at least one second component are switched on.

Thus, in the first standby mode, only the components necessary for the first detection function need to be switched on. The first standby mode therefore consumes very little energy, as the electricity consumption of this first detection function is low.

In the second standby mode, only the components necessary for the second detection function need to be switched on. This second detection function is more accurate. These two standby modes make it possible to perform a detection which is both accurate and low-consuming as, most of the time and in the absence of the user, only the first detection function is implemented. The second detection function is used, only to confirm the presence of the user.

In the third standby mode, the first component, slow to start up, is switched on. Thus, from the third standby mode, the electrical piece of equipment is capable of passing very quickly into the active mode.

The three standby modes of the invention therefore make it possible to significantly reduce the average electricity consumption in standby of the piece of equipment, while minimising the startup time perceived by the user.

In addition, a piece of equipment such as described above is proposed, the at least one first sensor comprising at least one microphone, the equipment comprising an audio processing module connected to the at least one microphone and arranged to implement the first detection function by analysing an audio signal captured by the at least one microphone.

In addition, a piece of equipment such as described above is proposed, wherein the audio processing module is arranged to calculate an average power of the audio signal, and to detect the presence of the user, if the average power is greater than a predetermined threshold.

In addition, a piece of equipment such as described above is proposed, wherein, before calculating the average power of the audio signal, the audio processing module applies a filter to an audio signal having a bandwidth which includes a frequency band corresponding to the human voice.

In addition, a piece of equipment such as described above is proposed, wherein the audio processing module uses a first automatic learning algorithm, trained beforehand, to detect in the audio signal, the presence of a sound corresponding to the presence of the user.

In addition, a piece of equipment such as described above is proposed, the at least one second sensor comprising a camera, the equipment comprising an image processing module connected to the camera and arranged to implement the second detection function by analysing images captured by the camera.

In addition, a piece of equipment such as described above is proposed, wherein the image processing module uses a Viola-Jones algorithm to detect a face in the images captured by the camera.

In addition, a piece of equipment such as described above is proposed, wherein the image processing module uses a second automatic learning algorithm, trained beforehand, to detect the presence of the user in the images captured by the camera.

In addition, a piece of equipment such as described above is proposed, the piece of equipment being arranged to pass from the first standby mode to the second standby mode, when the presence of the user is detected by the first detection function.

In addition, a piece of equipment such as described above is proposed, the piece of equipment being arranged to:

- pass from the second standby mode to the third standby mode, when the presence of the user is detected by the second detection function;

pass back from the second standby mode to the first standby mode if, after a first predefined duration, the second detection function does not detect the presence of the user.

In addition, a piece of equipment such as described above is proposed, the piece of equipment being arranged to, when it is in the third standby mode:

implement the second detection function;

as the presence of the user is detected by the second detection function, remain in the third standby mode;

if the presence of the user is no longer detected for a second predefined duration, pass back into the first standby mode.

In addition, a piece of equipment such as described above is proposed, the piece of equipment being arranged to, when it is in the first standby mode or the second standby mode or the third standby mode, pass into the active state, when the user performs a predefined action.

In addition, a piece of equipment such as described above is proposed, the piece of equipment being arranged to, when it is in the active state and when it does not detect action from the user for a third predefined duration, pass back into the third standby mode.

In addition, a piece of equipment such as described above is proposed, the piece of equipment being arranged to, before passing back into the third standby mode, send a message to the user, asking them to perform an action to cancel the passage into the third standby mode.

In addition, a piece of equipment such as described above is proposed, the piece of equipment being arranged to, before passing back into the third standby mode, attempt to detect the presence of the user using the second detection function, and, if the presence of the user is not detected for a fourth predefined duration, pass into the first standby mode, rather than into the third standby mode.

In addition, a piece of equipment such as described above is proposed, the piece of equipment being a set-top box.

In addition, a management method is proposed, implemented in the piece of equipment such as described above, and designed to manage transitions between the first standby mode, the second standby mode, the third standby mode and the active mode.

In addition, a computer program is proposed, comprising instructions which cause the piece of equipment such as described above to execute the steps of the management method such as described above.

In addition, a recording medium is proposed, which can be read by a computer, on which the computer program such as described above is recorded.

The invention will be best understood in the light of the description below of particular, non-limiting embodiments of the invention.

BRIEF DESCRIPTION OF THE DRAWINGS

Reference will be made to the accompanying drawings, among which.

DETAILED DESCRIPTION OF THE INVENTION

Figure 1:
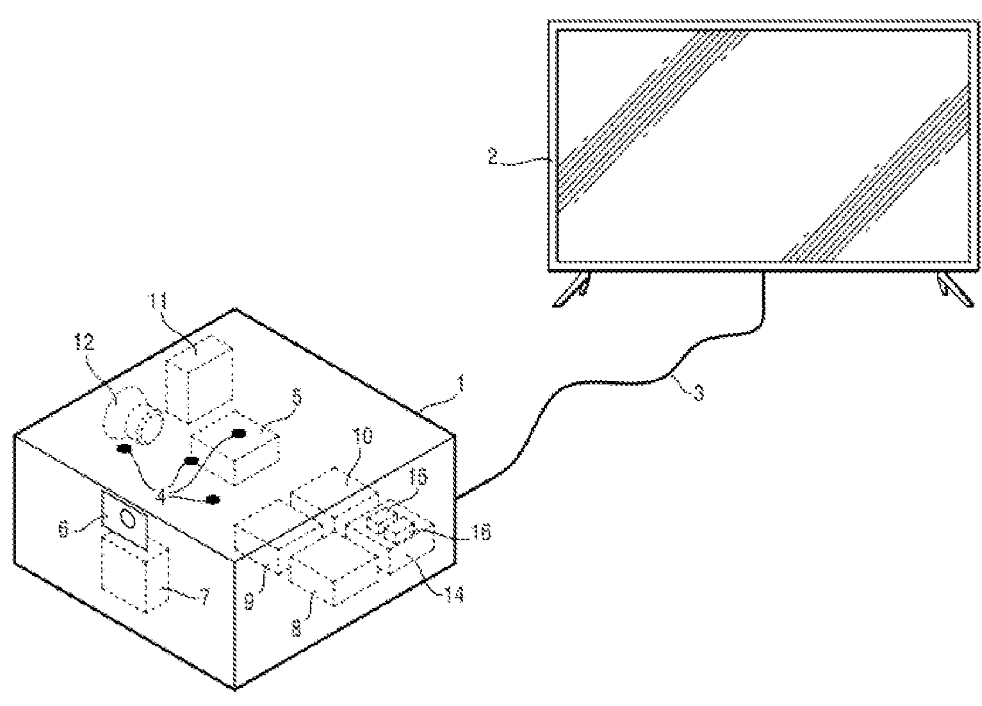
FIG. 1 represents a set-top box, wherein the invention is implemented.

In reference to FIG. 1, the invention is, in this case, implemented in a set-top box 1 (or STB), which is, for example, connected to a television 2 via an HDMI (high-definition multimedia interface) cable 3.

The set-top box 1 comprises at least one microphone 4, in this case, a plurality of microphones 4, and an audio processing module 5 connected to the microphones 4. The microphones 4 and the audio processing module 5 have a very low electricity consumption, typically of between 10 mW and 100 mW.

The set-top box 1 also comprises a camera 6 and an image processing module 7 connected to the camera 6. The camera 6 and the image processing module 7 have an electricity consumption which is low, but greater than that of the microphones 4 and of the audio processing module 5, typically equal to 800 mW.

The set-top box 1 further comprises a microprocessor 8 arranged to execute an OS and complex applications. The microprocessor 8 has a high electricity consumption, typically equal to 3 W.

The set-top box 1 also comprises a Wi-Fi network interface 9. The Wi-Fi network interface 9 has an average consumption, typically equal to 1 W.

The startup time of the microprocessor 8 and of the Wi-Fi network interface 9 are significant and are typically greater than 10 s.

The set-top box 1 also comprises one or more modules, the startup time of which is quick, such as, for example, an HDMI output module 10, as well as audio amplifiers 11 and speakers 12 enabling the playback of the sound.

The HDMI output module 10 has a low electricity consumption in itself, but switching it on can generate the startup of the television 2 to which it is connected via the HDMI cable 3, and which itself has a very high consumption, typically greater than or equal to 50 W.

The audio amplifiers 11 have a high electricity consumption, even when they simply play silence, which is typically equal to 3.5 W.

The set-top box 1 also comprises a power supply module 14 capable of supplying the other modules with energy separately or jointly.

The power supply module 14 comprises a processing component 15 (electronic and/or software), and for example, a "general" processor, a processor specialising in signal processing (or DSP, digital signal processor), a microcontroller, or a programmable logic circuit, such as an FPGA (field programmable gate array) or an ASIC (application specific integrated circuit). The power supply module 14 also comprises one or more memories 16 (and, in particular, one or non-volatile memories), connected to or integrated in the processing component 15. At least one of these memories 16 forms a recording medium which can be read by a computer, on which at least one computer program is recorded, comprising instructions which make the processing component 15 execute the steps of the method for managing transitions between standby modes, which will be described below.

In order to reduce the energy consumption as much as possible in standby, while ensuring a quick awakening when the user requests it (for example, by pressing a button on the remote control), the set-top box 1 can operate according to different standby or activity modes.

The set-top box 1, which comprises at least one sensor, at least one first component and at least one second component which is quicker to start up than the at least one first component, can operate according to at least:

one first standby mode (deep sleep), wherein at least one first sensor is switched on, the at least one first component and the at least one second component not being switched on, the set-top box 1 implementing a first detection function to detect a presence of a user using the first sensor;

one second standby mode (intermediate sleep), wherein at least one second sensor which is identical or not to the at least one first sensor is switched on, the at least one first component and the at least one second component not being switched on, the set-top box 1 implementing a second detection function to detect the presence of the user, more accurate and more consuming than the first detection function, using the at least one second sensor;

one third standby mode (light sleep), wherein the at least one first component is switched on, and the at least one second component is not switched on;

one active mode, wherein the at least one first component and the at least one second component are switched on.

In this case, the at least one first component comprises the microprocessor 8, which is slow to start up and the consumption of which is high. The at least one second component comprises the audio amplifiers 11 and/or the HDMI output module 10, which are quicker to start up and the consumption of which is itself also high (or, the operation of which can induce a high consumption, in the case of the HDMI output module 10).

The at least one first sensor comprises the microphones 4. The audio processing module 5 implements the first detection function by analysing an audio signal captured by the microphones 4. The at least one second sensor comprises the camera 6. The image processing module 7 implements the second detection function by analysing images captured by the camera 6.

Thus, in the first standby mode (deep sleep), the set-top box 1 is capable of detecting a sound activity, thanks to the microphones 4 and, in particular, of detecting the presence of the user in the proximity of the set-top box 1 thanks to the sounds that this produces.

In the second standby mode (intermediate sleep), the set-top box 1 is capable of visually detecting a presence in the field of the camera.

The second detection function is more accurate, but also more energy-consuming. The camera 6 is more consuming, and the processing of images requires a relatively high calculating power.

In the third standby mode (light sleep), the set-top box 1 is ready to start up quickly. In particular, the modules and components, the startup time of which is long, as switched on and can therefore start up, as soon as the set-top box 1 receives a command from the user.

Finally, in the active mode, the set-top box 1 is in service.

The table below summarised the switching on state of the modules, according to the standby or activity mode of the set-top box:

| | First standby mode | Second standby mode | Third standby mode | Active mode |
|---|---|---|---|---|
| Microphones, audio processing module | switched on | N/A | N/A | N/A |
| Camera, image processing module | switched off | switched on | switched on | switched on |
| Modules which are slow to start up: microprocessor | switched off | switched off | switched on | switched on |
| Modules which are quick to start up: audio amplifiers, HDMI output module | switched off | switched off | switched off | switched on |
| Power consumed | 10 to 100 mW | 800 mW | 4 W | >8 W |

It is noted that the microphones 4 and the audio processing module 5 must be switched on, when the set-top box 1 is in the first standby mode, and that they can be switched on or not in the other modes as needed (which explains the N/A, "not applicable", in the boxes in question in the table above).

Likewise, the camera 6 and the image processing module 7 can be switched off when the set-top box 1 is in the active mode, and switched on, only by intermittence to verify if a user is present before passing into standby.

The modules which are quick to start up are not necessarily all switched on the whole time in the active mode. The set-top box 1 could be used to watch a film (and therefore the HDMI output module 10 is switched on) with the sound on a Hi-Fi channel (and therefore the audio amplifiers 11 and the speakers 12 are switched off). Conversely, the set-top box 1 could be used as an audio speaker (and therefore the audio amplifiers 11 and the speakers 12 are switched on) without display (and therefore the HDMI output module 10 is switched off).

Figure 2:
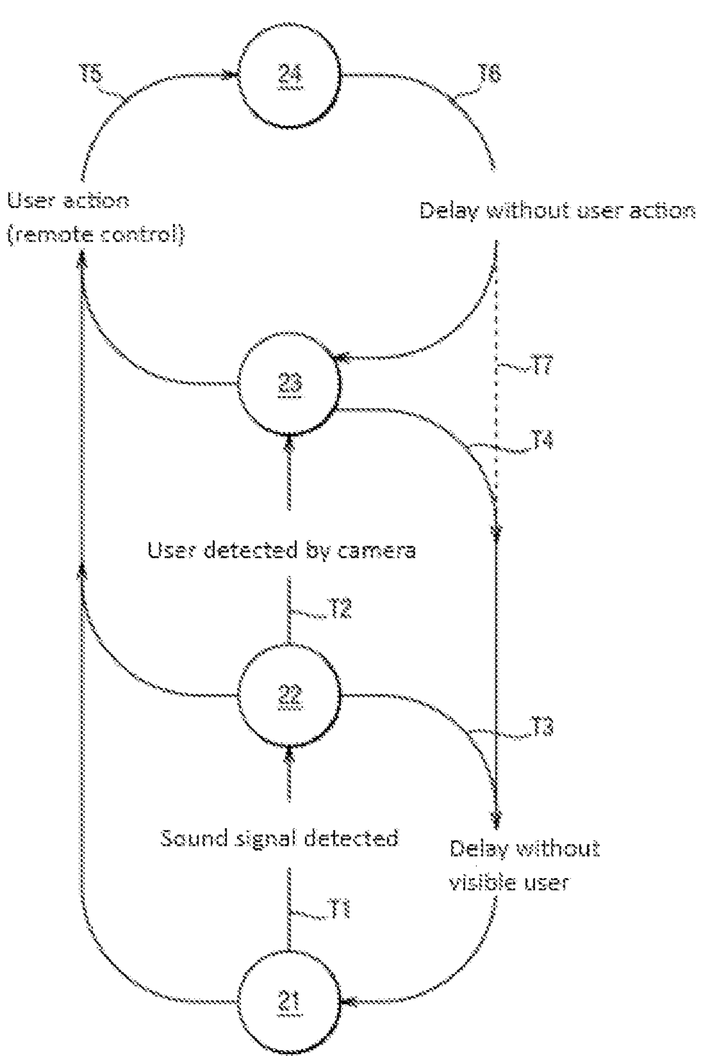
FIG. 2 represents transitions between the standby modes.

Now, in reference to FIG. 2, the transitions between the different modes are focused on.

It is the processing component 15 of the power supply module 14 which controls these different transitions.

The case is focused on where the set-top box 1 is in the first standby mode 21 (deep sleep). The set-top box 1 passes from the first standby mode 21 to the second standby mode 22 (intermediate sleep; transition T1), when the presence of the user is detected by the first detection function.

Thus, in the first standby mode 21, the audio processing module 5 analyses the audio signal captured by the microphones 4. If a signal representative of the presence of a user is detected, then the set-top box 1 passes into the second standby mode 22.

When the set-top box 1 is in the second standby mode 22, it passes from the second standby mode 22 to the third standby mode 23 (light sleep), when the presence of the user is detected (and therefore confirmed) by the second detection function: transition T2.

Thus, in the second standby mode 22, the image processing module 7 regularly analyses (for example, every second), the image captured by the camera 6. If a user is detected on the image, then the set-top box 1 passes into the third standby mode 23.

However, the set-top box 1 passes back from the second standby mode 22 to the first standby mode 21 if, after a first predefined duration, the second detection function does not detect the user: transition T3. The first predefined duration is short, for example of between 30 s and 1 minute.

Thus, if nobody has been detected in this short timeframe, then the set-top box 1 returns into the first standby mode 21.

When the set-top box 1 is in the third standby mode 23 (light sleep), the set-top box 1 implements the second detection function. As the presence of the user is detected by the second detection function, the set-top box 1 remains in the third standby mode 23. However, if the presence of the user is no longer detected for a second predefined duration, the set-top box 1 passes back into the first standby mode: transition T4.

Thus, in the third standby mode 23, the image processing module 7 regularly analyses (for example, every second), the image captured by the camera 6. As a person is detected on the image, the set-top box 1 remains in the third standby mode 23. If nobody is detected for the second predefined duration (for example, equal to 15 minutes), then the set-top box 1 returns into the first standby mode 21.

When the set-top box 1 is in the first standby mode 21 or the second standby mode 22 or the third standby mode 23, the set-top box 1 passes into the active mode 24 when the user performs a predefined action: transition T5.

Thus, in the three standby modes, if the user performs an awakening action (for example, pressing a button on the remote control or a button on the set-top box 1), then the set-top box 1 passes directly into the active mode 24.

When the set-top box 1 is in the active mode 24 and when it does not detect action from the user for a third predefined duration, the set-top box 1 passes back into the third standby mode 23 (light sleep): transition T6.

Thus, in the active mode 24, the set-top box 1 listens for the actions from the user (for example, pressing buttons on the remote control, voice commands, etc.). If there is no action from the user for the third predefined duration (which is a relatively long timeframe, for example, equal to 2 hours), then the set-top box 1 passes back into the third standby mode 23.

Optionally, before passing into the third standby mode 23, the set-top box 1 sends a message to the user, asking them to perform an action to cancel the passage into the third standby mode 23. The message is, for example, displayed on the screen of the television 2.

Optionally, before passing into the third standby mode, the set-top box 1 attempts to detect the presence of the user using the second detection function and, if the presence of the user is not detected for a fourth predefined duration, the set-top box 1 passes back into the first standby mode 21, rather than in the third standby mode 23: transition T7.

Thus, in the active mode 24, the image processing module 7 regularly analyses (for example, every second), the image captured by the camera 6. Before passing into the third standby mode 23 (light sleep), the set-top box 1 watches if a person has been detected during the fourth predefined duration (which is an average timeframe, for example, equal to 15 minutes) before making the decision to pass into standby. If nobody has been detected during this timeframe, then the set-top box 1 passes directly into the first standby mode 21 (deep sleep) instead of passing into the third standby mode 23.

Now, the detections made by the audio processing module 5 and by the image processing module 7 are focused on.

The audio processing module 5 analyses the audio signal captured by the microphones 4 to determine if it contains noises representative of the presence of a user in the proximity of the set-top box 1.

According to a particular embodiment, the audio processing module 5 calculates an average power of the audio signal, and detects that there are noises representative of the presence of a user, if the average power is greater than a predetermined threshold (for example, equal to −50 $dB_{FS}$).

Optionally, before calculating the average power of the audio signal, the audio processing module 5 applies a filter to the audio signal, in order to emphasise the frequencies corresponding to the human voice. The filter has, for example, a bandwidth which includes a frequency band corresponding to the human voice.

For example, the audio processing module 5 applies a bandwidth filter between 50 Hz and 1 kHz before calculating the average power and comparing it to the predetermined threshold.

In a variant, the audio processing module 5 can use other detection methods to analyse the audio signal captured by the microphones 4. The audio processing module 5 uses, for example, a first automatic learning algorithm, trained beforehand, to detect in the audio signal, the presence of a sound corresponding to the presence of the user. This can be, for example, an algorithm based on convolutional neural networks, or on recurrent neural networks.

This algorithm can be applied on a solid frequency band signal, or on a signal filtered by a bandwidth filter, for example such as the filter mentioned above.

Advantageously, the sampling frequency of the microphone can be reduced, in order to reduce the consumption necessary for the sampling, and reduce the quantity of data to be processed for the detection, while ensuring to preserve the frequencies corresponding to the human voice.

For example, the sampling frequency can be reduced to 8 kHz for the detection needs, while it could be of a lower value (like 48 kHz) for other uses.

Any other method capable of detecting the presence of a sound corresponding to a human presence can be used.

The image processing module 7 analyses the image captured by the camera 6 to determine if a user is visible in the field of the camera 6.

According to a particular embodiment, the image processing module 7 uses a Viola-Jones algorithm to detect a face in the images captured by the camera 6.

According to another embodiment, the image processing module 7 uses a second automatic learning algorithm, trained beforehand, to detect the presence of the user in the images captured by the camera 6.

The image processing module 7 uses, for example, a neural network, such as, for example, BlazeFace or MobileNet to detect the presence of a user in the image. These different methods all make it possible to detect if a face or a person is present in the image (as well as their position, moreover).

Naturally, the invention is not limited to the embodiments described, but includes any variant entering into the field of the invention, such as defined by the claims.

The invention is not necessarily implemented in a set-top box, but could be implemented in any piece of equipment comprising at least one sensor, making it possible to detect the presence of a user in the proximity of the piece of equipment.

The sensors used could be different.

In this case, it has been described, for the first detection function, to use microphones and an audio processing module. Indeed, these components have a very low consumption. Other types of low-consumption sensors could be used, like for example a PIR (Passive InfraRed)-type proximity sensor. The principle would be identical, as the low detection reliability of this type of sensor (false positives due to brief passages of a human or of an animal, or due to sunshine variations) requires a confirmation in the second step by a more accurate detection function, using, for example, a camera.

The first detection function and the second detection function could use one same sensor (or several same sensors). Indeed, it can be provided that the second detection function is more accurate by using a greater number of captures, or captures made at a greater frequency, or by performing more complex and more efficient calculations and processing.

The invention claimed is:

1. A piece of equipment comprising at least one sensor, at least one first component and at least one second component which is quicker to start up than the at least one first component, the piece of equipment being arranged to operate according to at least:

one first standby mode, wherein at least one first sensor is switched on, the at least one first component and the at least one second component not being switched on, the piece of equipment implementing a first detection function to detect a presence of a user by using the at least one first sensor;

one second standby mode, wherein at least one second sensor, which is identical or not to the at least one first sensor, is switched on, the at least one first component and the at least one second component not being switched on, the piece of equipment implementing a second detection function to detect the presence of the user, more accurate and more consuming than the first detection function, by using the at least one second sensor;

one third standby mode, wherein the at least one first component is switched on and the at least one second component is not switched on;

one active mode, wherein the at least one first component and the at least one second component are switched on.

2. The piece of equipment according to claim 1, the at least one first sensor comprising at least one microphone, the piece of equipment being arranged to implement the first detection function by analysing an audio signal captured by the at least one microphone.

3. The piece of equipment according to claim 2, being arranged to calculate an average power of the audio signal, and to detect the presence of the user if the average power is greater than a predetermined threshold.

4. The piece of equipment according to claim 3, wherein, before calculating the average power of the audio signal, the piece of equipment applies a filter to the audio signal having a bandwidth which includes a frequency band corresponding to the human voice.

5. The piece of equipment according to claim 2, wherein the piece of equipment uses an automatic learning algorithm, trained beforehand, to detect in the audio signal, the presence of a sound corresponding to the presence of the user.

6. The piece of equipment according to claim 1, the at least one second sensor comprising a camera, the piece of equipment being arranged to implement the second detection function by analysing images captured by the camera.

7. The piece of equipment according to claim 6, wherein the piece of equipment uses a Viola-Jones algorithm to detect a face in the images captured by the camera.

8. The piece of equipment according to claim 6, wherein the piece of equipment uses an automatic learning algorithm, trained beforehand, to detect the presence of the user in the images captured by the camera.

9. The piece of equipment according to claim 1, the piece of equipment being arranged to pass from the first standby mode to the second standby mode, when the presence of the user is detected by the first detection function.

10. The piece of equipment according to claim 1, the piece of equipment being arranged to:

pass from the second standby mode to the third standby mode, when the presence of the user is detected by the second detection function;

pass back from the second standby mode to the first standby mode if, after a predefined duration, the second detection function does not detect the presence of the user.

11. The piece of equipment according to claim 1, the piece of equipment being arranged to, when it is in the third standby mode:

implement the second detection function;

as the presence of the user is detected by the second detection function, remain in the first standby mode;

if the presence of the user is no longer detected for a second predefined duration, pass back into the first standby mode.

12. The piece of equipment according to claim 1, the piece of equipment being arranged to, when it is in the first standby mode or the second standby mode or the third standby mode, pass into the active state when the user performs a predefined action.

13. The piece of equipment according to claim 1, the piece of equipment being arranged to, when it is in the active state, and when it does not detect action from the user for a first predefined duration, pass back into the third standby mode.

14. The piece of equipment according to claim 13, the piece of equipment being arranged to, before passing back into the third standby mode, send a message to the user asking them to perform an action to cancel the passage into the third standby mode.

15. The piece of equipment according to claim 13, the piece of equipment being arranged to, before passing back into the third standby mode, attempt to detect the presence of the user by using the second detection function, and, if the presence of the user is not detected for a second predefined duration, pass into the first standby mode, rather than into the third standby mode.

16. The piece of equipment according to claim 1, the piece of equipment being a set-top box.

17. A management method, implemented in the piece of equipment according to claim 1, and designed to manage transitions between the first standby mode, the second standby mode, the third standby mode and the active mode.

18. A non-transitory computer-readable medium, on which a computer program is recorded, wherein the computer program comprises instructions which cause a piece of equipment to execute the steps of the management method according to claim 17.

* * * * *